Feb. 8, 1927. 1,617,196
C. V. BOYS
MEANS FOR MEASURING AND DELIVERING GAS AT A KNOWN RATE
Filed Nov. 9, 1921 2 Sheets-Sheet 1
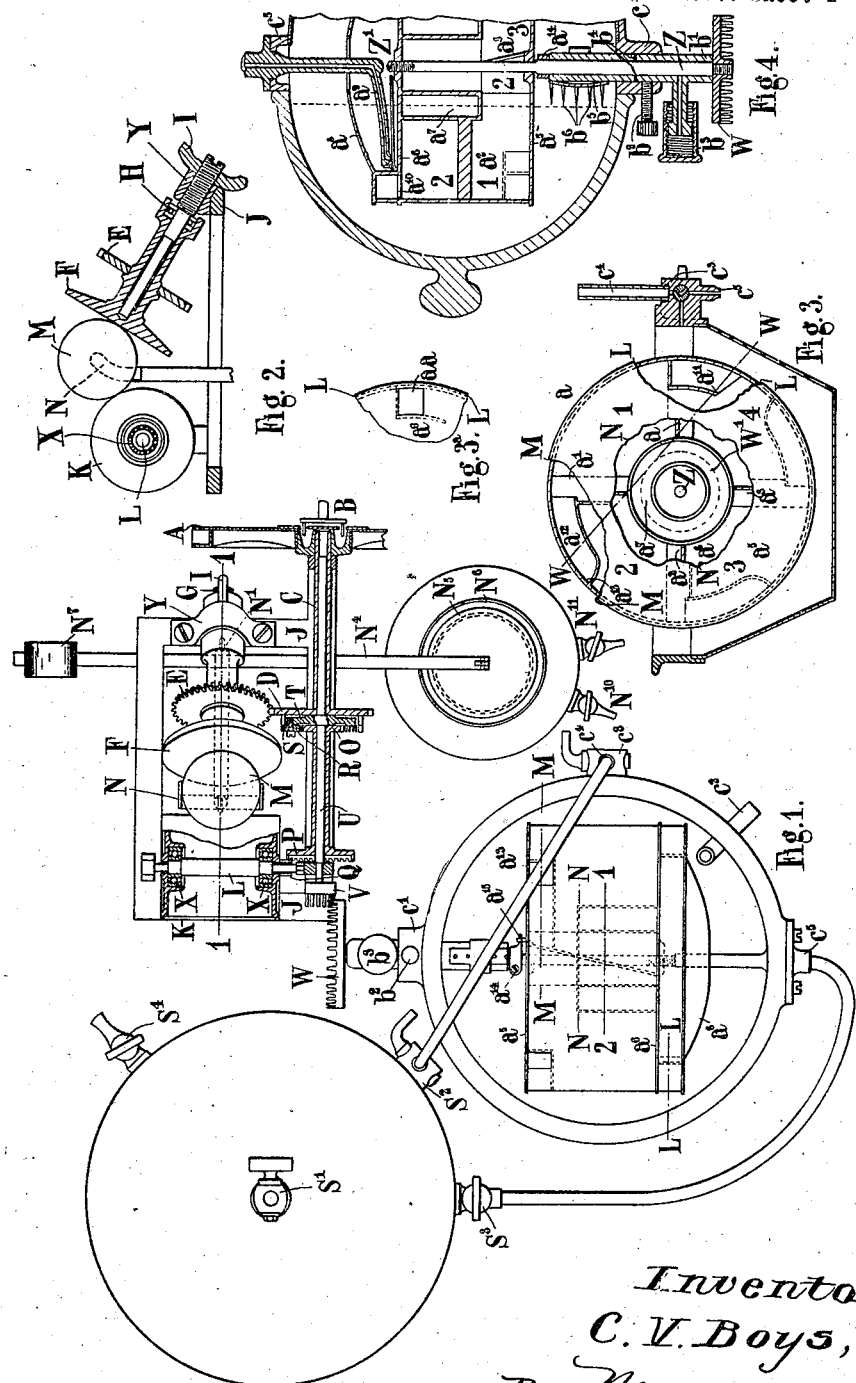
Inventor
C. V. Boys,
By Marks & Clerk
Attys.

Feb. 8, 1927.                                              1,617,196
C. V. BOYS
MEANS FOR MEASURING AND DELIVERING GAS AT A KNOWN RATE
Filed Nov. 9. 1921                    2 Sheets-Sheet 2
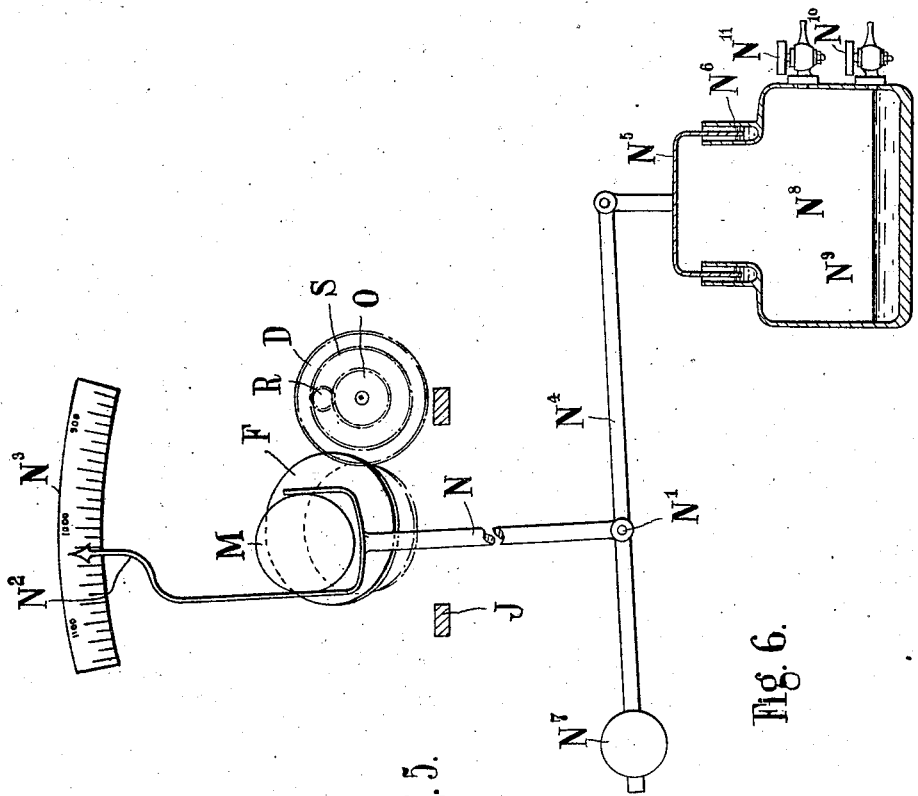
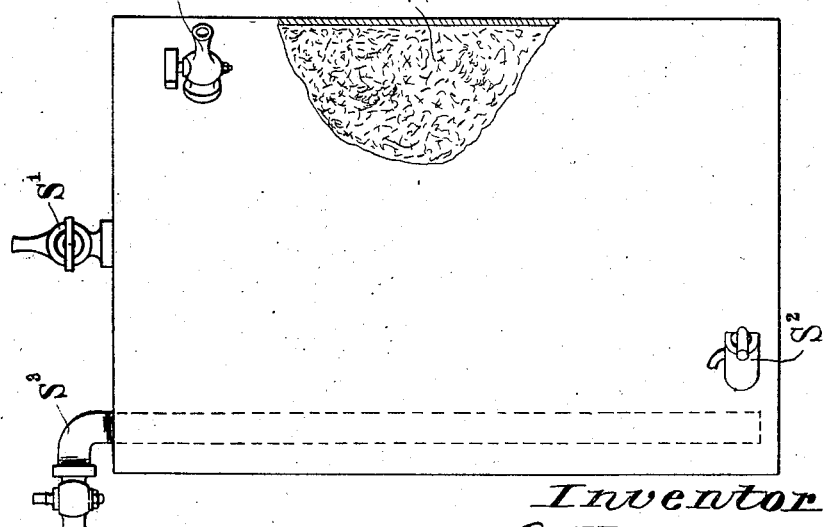
Inventor
*C. V. Boys,*
By *Marks Clerk*
*Attys.*

Patented Feb. 8, 1927.

1,617,196

UNITED STATES PATENT OFFICE.

CHARLES VERNON BOYS, OF LONDON, ENGLAND.

MEANS FOR MEASURING AND DELIVERING GAS AT A KNOWN RATE.

Application filed November 9, 1921. Serial No. 514,054.

This invention relates to new or improved means for measuring and delivering gas at a known rate and while it has special relation to the measurement of gas in flow calorimeters whether recording or otherwise it is of wider application.

In recording gas calorimeters in particular the most difficult problem has been the automatic correction for the varying volume of a definite quantity of gas in consequence of the effect of temperature and pressure on its own volume and the effect of these on the proportion of contained water vapour and hence of its total volume. What is required is that the gas should be measured and delivered at such a rate, whatever the temperature and pressure may be at the moment, that if it were thereafter brought to standard temperature and pressure and were still saturated with water vapour and measured in that condition the rate of flow so measured should be constant. The solution of this problem is also desirable in connection with non-recording calorimeters and, whether the gas is saturated or not, for many purposes and investigations among which may be mentioned the measurement of air in physiological investigations. Further, more especially in the case of recording gas calorimeters, it is important that the measurement and delivery should be performed with the highest possible degree of accuracy, if possible in excess of that hitherto customary in the use of meters used in gas testing.

In my co-pending application No. 440,453, I have shown as a part of a complete recording calorimeter one way of solving this problem. According to my present invention, I maintain the water level constant, so that any form of drum may be used, and the same actual volume of gas is allowed to pass for each revolution of the drum, but the rate of rotation of the axle is made variable, so as to pass gas in such volume as to correspond to its volume at the temperature and pressure of the moment. Furthermore, I effect rotation of the meter axle positively by the clock and intermediate toothed gearing, but I use epicyclic gearing in conjunction with an integrator of the well known ball cylinder and disc type (as used by the late Lord Kelvin in his tide-calculating machines) in order to make the necessary slight variation in the speed of the clock driven axle. Again, I use vaseline or similar material to seal the meter axle and sleeve, and the joint between the transparent metal cover and the casing, and I cause the gas before it enters the meter to pass through a saturator chamber near the meter, so as to pick up all the water vapour that it can carry, or to deposit excess before it enters the meter.

According to another feature of my present invention, I arrange a series of points nearly at the same level, within the meter, in order to enable more precise observation possible than by the usual setting by a line.

I will now describe a particular exemplification of the present invention with reference to the accompanying diagrammatic drawings, it being understood that any particular proportions or dimensions refer to the particular exemplification illustrated and are not generally necessary to the invention but may be varied to suit particular requirements.

Figure 1 is a plan view, partly in section and with part removed, of a convenient arrangement of apparatus according to my present invention incorporating meter, saturator, integrator and correction chamber;

Figure 2 is a vertical section of the integrator;

Figure 3 is an end view, partly in section, of the drum housed within its casing, the latter being wholly in section on its diameter;

Figure 3$^a$ is a detail view of part of the meter drum;

Figure 4 is a longitudinal vertical section through the axis of the meter, casing and bell, the lower part which is unnecessary for the explanation being broken away;

Figure 5 is an elevational view with part broken away of a convenient form of saturator vessel, and Figure 6 is a diagram illustrating the means whereby the air bell operates the integrating device.

The water wheel employed is the water wheel of my above-mentioned application, which wheel gives power to and is governed by the one-wheel clock. Instead of driving the meter axle direct as in my former application the mechanism of Figures 1 and 2 is now interposed. The water wheel A transmits its power to the clock through the clutch B as in said former application and it also turns the hollow shaft C and gear wheel D. The gear wheel D gears with an equal wheel E with its axis tipped up at an angle of 30° and in order that the teeth may engage they are cut at an angle of 15° with the axis, the two wheels being identical in form. The wheel E and the disc F of the integrator are carried upon the inclined shaft G and the weight is taken by the ball thrust washer H. The lower end of the shaft G is enlarged and screwed so that the exact height of the disc F can be adjusted and then secured by the lock nut I. The axle G is carried by the angle bracket Y secured to the main frame J on which are mounted also the integrating cylinder and epicyclic gearing. The integrating cylinder K is mounted in ball bearings X X on the shaft L which is carried on the main frame as is made clear in the figure. Between the disc F and cylinder K a ball M is allowed to rest and, as shown, this rests on each at a point where the surface makes an angle of 60° with the horizontal. It follows from this construction that the ball presses against each with a force equal to its weight and so the force which it can transmit tangentially to the integrating drum K is equal to its weight multiplied by the coefficient of friction. The disc F might be set vertical in which case the inclined teeth on the gear wheels D and E would be replaced by the usual straight teeth but the force with which the ball would press against the disc would be less than that with which it would press against the cylinder and the driving capacity would be reduced. The ball M can be made to roll along the trough in which it rests by the action of the fork N which is actuated by the air bell, as will be described. When the temperature and pressure are standard or normal and no correction of volume is needed the ball M is located so as to rest against the centre point of the disc and then the drive from the water wheel A to the meter axle Z is through the epicyclic gearing and the integrator takes no part beyond holding the sun wheel O stationary by means of the intervening contrate wheel P and lantern pinion Q. Then the wheel D by means of its contrate part S and the planet pinion R causes the arm T which is in one piece with the axle U and lantern pinion V to turn in the same direction and at a slower speed. If, as shown, the number of teeth in O, R and S are in the proportions of 2, 1 and 4 respectively, then the arm T will turn at two-thirds of the speed of S when O is prevented from turning and if the lantern pinion V has one-quarter of the number of teeth that are cut on the contrate wheel W which is carried on the meter axle Z, then six turns of the water wheel will be required to produce one turn of the meter axle, that is, if the sun wheel O is held at rest.

If, however, owing to the action of the air bell, the ball has been shifted to a point on the disc F which is eccentric it will be caused to rotate and to turn the cylinder in one direction or the other according to the side of the disc F against which it rests and at a speed which is proportional to the eccentricity of the point of contact. The sun wheel O will therefore partake of these motions but reduced in amount by the ratio of gearing of the lantern pinion Q and contrate wheel P which in the example illustrated is as 5 is to 1. If the ball is on the side nearer to the epicyclic shaft the sun wheel O and contrate wheel S will turn in opposite directions and the arm T and hence the meter axle will turn at less than the normal speed, which is the condition required when the barometer is high or thermometer low. If, on the other hand, the ball is on the remote side the said two wheels will rotate in the same direction and the arm and meter axle will turn more quickly than normally and this occurs when the barometer is low or the thermometer high. The epicyclic reduction gearing illustrated has the effect of making rotation of the sun wheel O only half as effective as rotation of the contrate wheel S and thus if the contrate wheel S were at rest three turns of the sun wheel would be needed to make one turn of the arm T. As in addition there is the reduction gear Q P and the reduction gear V W also included between the cylinder K and the meter axle Z the actual gear ratio between the cylinder K and the meter axle Z is 60 to 1 and thus a very feeble force only is needed to effect the drive of said axle which the ball friction is easily able to produce. If both the sun wheel O and contrate wheel S are turning the resultant motion is the algebraic sum of the two motions described above and so the meter axle can be made to move at the required speed infinitely variable with the weather.

Taking the epicyclic reduction gear, and reduction gear P Q, only the reduction from the cylinder K to the arm T is 15 to 1 while that from the water wheel A to the arm T is 3 to 2 or 1.5 to 1 thus the integrator cylinder is geared down ten times as much as the main drive. If the ball is eccentric to an extent equal to the radius of the cylinder K the disc and cylinder turn at the same speed and in that case the cylinder and water wheel turn at the same speed; accordingly this is the position of the ball for a 10 per cent. correction. Its eccentricity must be made less as the correction needed is less and on one side or the other as the correction is one of increase or decrease of speed. Further, if as I have made it the radius of the cylinder is equal to the displacement of the pen on the record due to a 10 per cent. change then there is the further gain in simplicity of numerical relationship that the linear movement of the ball and the effect of such movement on the chart or record are equal to one another.

The only object in using the contrate wheel W in place of an ordinary spur wheel is to bring the meter round to a more convenient position and make the whole combination with the rest of the calorimeter more compact. It will be evident that the reduction gear V W might be replaced by an equal reduction gear between the water wheel A and the wheel D which would have the effect of making the integrator turn more slowly, thus increasing the mechanical advantage of the water wheel on this mechanism but in equal degree reducing the very great mechanical advantage of this mechanism on the meter axle or the reduction may be effected partly in one place and partly in the other.

W is the contrate wheel seen in Figure 1 attached to the axle Z. On this axle the drum $a$ rides loose engaging, however, with the screw $Z_1$ at the end of said axle, as described in my said former application. This drum is a modified ordinary four-part meter drum. Thus, there are the four sloping radial partitions $a$, $a_1$, $a_2$, $a_3$, which are joined to the discs $a_5$, $a_6$, forming the ends of the drum. $a_7$ is the buoyancy box forming part of the drum, as clearly shown in the three figures. $a_8$ is the mantle of the drum receiving gas from the gas inlet pipe $a_9$, as described in my said former application, with vane and governing action as there described. The inlet passages to the several compartments are of the form illustrated in section in the broken away part L, Figure 3, this being taken on the line L—L of Figure 1 and communicating with the compartment 1 by a hole $a$, $a$, shown in Figure $3^a$, which is a piece of the plate $a_6$ seen through the same break-away as the section on the line L—L, or communicating with compartment 2 by a hole $a_{10}$ shown in section in Figure 4. As the drum rotates in the direction shown by the arrow the lips $a_{11}$ of any of these inlet passages one by one enter the water. Thus, if the dotted line $w$ $w$, tangential to the dotted circle $w_1$ represents only in relation to the drum the water level at some moment, then Figure 3 shows the lip $a_{11}$ just as it enters the water. At this moment the gas in the compartment 1 is trapped and the amount trapped is that which will be delivered from it as the drum continues its rotation. Coming, now, to the exit passages, one of these, $a_{12}$, delivering gas from the compartment 1 is clearly seen in section in Figure 3, this section being on the line M—M of Figure 1. It will here be seen that the outlet orifice $a_{13}$ in the periphery of the drum is still just below the water level as the lip $a_{11}$ enters the water but that upon a very small further movement of the drum the orifice $a_{13}$ will emerge above the water and the gas will be free to escape from the compartment. Further, it will be seen that as the cross-sections of the inlet and outlet passages are equal the volume of the compartment above the water level does not change appreciably during the small movement in which the gas is trapped, a most necessary condition for perfectly smooth working. N, N, Figure 3, is broken away to show the buoyancy box and partitions on the line N—N, Figure 1.

From a further inspection of Figure 4 it will be seen that the axle Z is carried in a long sleeve $b_1$ held in place in the boss $c_1$ by the screw $b_2$ and carrying a lubricator $b_3$ by which vaseline or similar lubricant may be injected into the axle bearing. Holes $b_4$ allow some of this lubricant to find its way into any space there may be between the sleeve $b_1$ and the hole in the meter casing $c_1$ in which it is locked by the screw $b_3$, thus lubricant can be made to fill any space by which water might escape and thus ensure freedom from leakage at these places. On the sleeve $b_1$ within the meter a clip $b_5$ is sprung and this clip carries a number of points $b^6$ of very slightly differing heights so that the observer can see whether the water level is exactly that desired as already explained. A stop $a_{14}$ is clamped to the meter axle Z so as to engage with a stop $a_{15}$ attached to the drum when the drum in consequence of any failure of supply of gas while the axle is still kept rotating screws itself along the axle Z until it is so prevented from continuing its motion. Thereafter rotation of the axle will forcibly turn the drum and cause water to be lifted in the mantle and inlet compartments and the resistance so offered will stop the clock. If subsequently the gas supply is continued, the drum screws itself to the other end of the axle as described in my former application and shuts off the gas. The stop $a_{14}$ and wheel W serve also to locate the axle longitudinally.

In Figure 1 the outlet gas pipe $C_2$ is shown which within the meter is carried up well above the water level. In Figures 1 and 3 the three-way tap $C^3$ and water inlet $C_4$ and outlet $C_5$ are shown by means of which the water level in the meter may be adjusted when setting up or as occasion should require. If water ever has to be added during the continued use of the recording calorimeter the water supplied to $C_4$ should be drawn from the saturator to be described so that it may already be saturated with any soluble constituents of the gas and not abstract any slight fraction of its calorific value.

Figure 5 is a diagram of a saturator in elevation. The saturator is a vessel of any convenient form lightly packed with porous material 10. A water inlet $S_1$ and outlet $S_2$ are provided so that the porous material may be thoroughly wetted from time to time and also a gas inlet $S_4$ and outlet $S_3$ so that gas shall pass through the whole extent of the vessel. This is conveniently placed on a shelf at a level above the meter and out of the way with a pipe leading from the water outlet $S_2$ to the water inlet $C_4$ of the meter and a pipe leading from the gas outlet $S_3$ to the gas inlet $C_5$ of the meter. It will be noticed that no provision is now made for the multiple tap of my former application or for the use of the vessels for proving the meter since with the point system of observation of water level and present form of drum the gas passing capacity can be determined once for all (since it changes only imperceptibly) and the number of points that should be visible above water determined for the water level that gives the correct capacity, thus saving much expense and time for proving the meter. The casing of the meter only needs to be levelled for the above to be a perfectly satisfactory way of avoiding the expense and trouble of proving the meter. It will be evident that the herein described meter, whether the drum is loose on a screwed axle or is fast on a freely-turning axle, is of general application and is very greatly preferable to existing meters used in gas testing.

Figure 6 is a diagram of the apparatus by means of which the ball of the integrator is made to roll in its channel to the place where it will actuate the integrator so as to correct for temperature and pressure. The fork N is pivoted at a point $N_1$ to a fixed point on a table, bracket or shelf of the complete calorimeter so that as the fork N is moved over its extreme permitted range the ball travels from a point near one side of the disc F to a point near the other side and a pointer $N_2$ carried by N passes over a scale divided from 900 on the right through 1000 in the middle to 1100 on the left-hand end, these numbers representing the volumes that gas of volume 1000 under standard conditions would occupy at the temperature and pressure of the moment. As already explained, if the ball is made to roll to a position of suitable eccentricity the meter axle will be made to turn at a rate proportional to the gas volume of the moment and this is shown by the pointer $N_2$ on the scale $N_3$. In order to give the correct movement to the fork N this is connected to an arm $N_4$ at right angles which carries the bell $N_5$ and counterweight $N^7$. The lip of the bell $N_5$ dips under mercury $N_6$ in the annular rim of the bottle $N_8$ containing air and water $N_9$. The bottle is of such capacity that the movement of the bell will correspond to a change of volume of the contained air represented by the numbers on the scale $N_3$. It will be seen then that with every change of temperature and pressure the bell $N_5$ will shift its position as the saturated air within is at atmospheric temperature and pressure and thus the ball is suitably moved so as to give rise to the necessary variations of speed of the meter axle as already sufficiently explained. A tubulure and three-way tap $N_{10}$ are provided so that water may be added or removed as in the case of the meter so that the air capacity may be adjusted and a tubulure and tap $N_{11}$ so that the position of the pointer $N_2$ may be adjusted also.

Having now described my invention, what I claim as new and desire to secure by Letters Patent is:—

1. Apparatus for maintaining constant the volume of gas if measured at standard temperature and pressure, and saturated with water vapour, passed in unit time by a gas measuring and delivering device operating substantially at atmospheric pressure, notwithstanding possible deviation from predetermined conditions of the barometric pressure and the temperature, including a constant volume measuring element, a constant time-governed source of uniform motion, variable speed mechanism between said element and said source of motion, and means controlling said variable speed mechanism so as to eliminate errors due to such deviation.

2. Apparatus for measuring and delivering gas at a known rate including a source of uniform motion, a meter, an epicyclic gearing between said source of motion and said meter and an integrator coacting with said epicyclic gearing.

3. Apparatus for measuring and delivering gas at a known rate including a source of uniform motion, a meter, a reduction epicyclic gearing between said source of motion and said meter and an integrator coacting with said reduction epicyclic gearing.

4. Apparatus for measuring and delivering gas at a known rate including a source of uniform motion, a meter, an integrator, an asymmetrical epicyclic gearing between said source of motion and said meter coacting with said integrator and giving a greater reduction to the motion received from the integrator than it gives to the motion received from the source of motion.

5. In combination in a wet gas meter, a meter drum, including end members comprising complete discs, a plurality of radial partitions, and tubular gas inlet and outlet passages in said drum.

6. In a wet gas meter, a drum, a plurality of measuring compartments therein, a buoyancy chamber occupying part of the axial length of the drum, and partitions separating said compartments, and abutting said buoyancy chamber.

7. The combination with a wet gas meter of a saturator for the gas maintained at the same temperature as the meter for the purpose of avoiding variation in the water level of the meter caused by evaporation or condensation.

8. In combination, a constant speed source of power, a constant volume gas measuring and delivering device, integrating mechanism, including a variable element, co-acting with both said source of power and said device, and an air bell co-acting with said variable element, and moving in accordance with the effect upon the volume of the gas of deviation of atmospheric conditions from the normal.

9. Apparatus for measuring and delivering gas at a known rate irrespective of variation of atmospheric conditions including an integrator comprising a disc, ball and cylinder and an air bell influenced by said conditions and coacting with the ball of said integrator to counteract the effect of such variation.

10. Apparatus for measuring and delivering gas at a known rate irrespective of weather variation including an integrator comprising a disc, ball and cylinder, an air bell influenced by the weather and co-acting with the ball of said integrator to counteract the effect of such variation, and a means for indicating the position occupied by the ball at any instant.

In testimony whereof I have signed my name to this specification.

CHARLES VERNON BOYS.